United States Patent
Ito et al.

(10) Patent No.: US 8,937,733 B2
(45) Date of Patent: Jan. 20, 2015

(54) INTERNET FACSIMILE AND IMAGE TRANSMISSION METHOD

(75) Inventors: Hiroyasu Ito, Okazaki (JP); Tomoyuki Atsumi, Toyohashi (JP); Tatsuro Asano, Toyokawa (JP); Hiroaki Sugimoto, Nagoya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1304 days.

(21) Appl. No.: 10/976,926

(22) Filed: Nov. 1, 2004

(65) Prior Publication Data

US 2005/0280860 A1 Dec. 22, 2005

(30) Foreign Application Priority Data

Jun. 3, 2004 (JP) .................................. 2004-165470

(51) Int. Cl.
- *G06F 15/16* (2006.01)
- *H04N 1/00* (2006.01)
- *H04L 12/58* (2006.01)
- *H04L 29/06* (2006.01)

(52) U.S. Cl.
CPC ........ *H04L 12/5835* (2013.01); *H04N 1/00214* (2013.01); *H04L 51/066* (2013.01); *H04L 67/38* (2013.01); *H04N 1/00212* (2013.01)
USPC ........... 358/1.15; 358/400; 358/402; 709/232

(58) Field of Classification Search
USPC .......................... 709/232; 358/1.15, 400, 402
See application file for complete search history.

(56) References Cited

U.S. PATENT DOCUMENTS

| 5,642,205 | A  | * | 6/1997  | Kassmann ..................... 358/468 |
| 6,101,548 | A  | * | 8/2000  | Okada ........................... 709/236 |
| 6,493,105 | B1 | * | 12/2002 | Onuma ......................... 358/1.15 |
| 6,742,161 | B1 | * | 5/2004  | James et al. ................... 715/205 |
| 7,489,416 | B2 | * | 2/2009  | Ishikawa ...................... 358/1.16 |
| 7,596,691 | B2 | * | 9/2009  | Koue et al. .................... 713/154 |

FOREIGN PATENT DOCUMENTS

| JP | 2001-007975 | 1/2001 |
| JP | 2002-007975 | 1/2001 |
| JP | 2002-135515 | 5/2002 |
| JP | 2003-046702 | 2/2003 |

OTHER PUBLICATIONS

Notification of Reasons for Refusal issued in corresponding Japanese Patent Application No. 2004-165470, mailed Jun. 10, 2008, and an English translation thereof.

* cited by examiner

*Primary Examiner* — Tammy Pham
*Assistant Examiner* — Lawrence Wills
(74) *Attorney, Agent, or Firm* — Buchanan Ingersoll & Rooney PC

(57) ABSTRACT

An Internet facsimile machine includes an e-mail generating unit and an e-mail send unit. For sending a multi-page document, the e-mail generating unit generates separate e-mails and attaches image data of a specific page of the document to one of the e-mails and image data of remaining pages to another of the e-mails. The e-mail send unit sends each e-mail. With this arrangement, regardless of the size of image data of the entire document, it is ensured that at least the specific page showing contact information of the sender is successfully sent to the recipient.

10 Claims, 6 Drawing Sheets

FIG.5

| No. | RECIPIENT ADDRESS | RESOLUTION | NUMBER OF PAGES READ | PAPER SIZE | NUMBER OF PAGES SENT | STATE |
|---|---|---|---|---|---|---|
| 1 | xxx@yyy.com | 200x100dpi | 8 | A4 | 1 | SENDING |
| .. | .. | .. | .. | .. | .. | .. |

FIG.6

| MAIL NO. | PAGE | REMARKS |
| --- | --- | --- |
| 1 | P1 | FIRST PAGE ONLY |
| 2 | P2~P5 | PAGES NOT EXCEEDING PERMISSIBLE SIZE |
| 3 | P6~P8 | PAGES INCLUDING LAST PAGE |

INTERNET FACSIMILE AND IMAGE TRANSMISSION METHOD

This application is based on an application No. 2004-165470 filed in Japan, the contents of which are hereby incorporated by reference.

BACKGROUND OF THE INVENTION (1) Field of the Invention

The present invention relates to an Internet facsimile machine for sending a facsimile via e-mail and also relates to an image transmission method for execution by the machine.

(2) Description of the Related Art

Recent technology has introduced Internet facsimile machines capable of sending an image via e-mail over the Internet. The image transmission by Internet facsimile machines (also referred to simply as "FAX machines") is carried out in the following manner. First, a FAX machine at a sending end reads a paper document using its image reader unit to generate image data, and then sends the image data as an attachment to an e-mail over the Internet, using its mail server. A FAX machine at a receiving end receives the e-mail using its mail server, and prints out the received image data using its printer unit.

Generally, mail servers on FAX machines and relay mail serves, which relay e-mail on the Internet, are restricted in terms of the permissible data size of e-mail they can send and receive. This restriction is imposed in order to avoid heavy traffic on the Internet due to transmission of a large amount of data at a time. Unfortunately, however, this arrangement causes the following problem. In an attempt to send a number of pages, image data of a relatively large size needs to be sent as an e-mail attachment. In the case where an e-mail with such an attachment exceeds the permissible size, the e-mail can not be sent or received.

In addition, such large-sized image data involves another problem. A receiving FAX machine may not have sufficient memory left for storing the e-mail or expanding the image data. In such a case, the FAX machine fails to print out the image data.

Turning to FAX machines capable of color image transmission, which are now in increasing demand, the problems mentioned above are even worse.

In order to avoid the problems, JP 10-322501-A and JP 2003-46702-A disclose techniques of transmitting image data representing a multi-page document as a plurality of e-mail attachments, thereby reducing the size of each e-mail. According to the techniques disclosed, the image data, which is generated on a page-by-page basis, is sequentially divided into pieces for every two or more pages in a manner that none of the pieces exceeds the permissible size that the receiving mail server can handle. Each piece of image data is then separately sent by a single e-mail. This is to facilitate the reconstituting of the faxed image, which would otherwise be complex due to the greater number of e-mails.

Yet, there still is a problem as follows. The admissible size is set individually for each mail server. Thus, even if an e-mail is generated so as not to exceed the admissible size set for the sending-end mail server, the e-mail may exceed the admissible size set for a relay mail server or receiving-end server. In that case, the e-mail can not be successfully transmitted to the receiving mail server. Furthermore, it is highly likely to receive only one e-mail with an attachment carrying image data of the last page or last few pages of a multi-page document, whereas the other e-mails fail to be delivered. This is because the image data of a multi-page document is sequentially divided into pieces from the beginning on a multiple-page basis. As a result, the last piece usually represents the last few pages or possibly the last one page of the document. Thus, an e-mail with an attachment carrying the last piece is smaller in size than the other e-mails.

Normally, however, it is the first page of the document that contains, as the cover page, important information for identifying the sender. Thus, from the information contained in the last page or last few pages, it is difficult to figure out who the sender is. Not knowing the sender, the recipient can not take any action, such as requesting re-sending of the facsimile, to attend the facsimile transmission failure. Yet, the sender hardly finds out that the facsimile transmission has failed because the operations for sending out the facsimile have been duly completed. With this being the situation, there is a demand for a FAX machine capable of reliably sending to the recipient, the image of a specific page which contains information for contacting the sender.

SUMMARY OF THE INVENTION

In view of the above, the present invention aims to provide an Internet facsimile machine and an image transmission method for execution by the facsimile machine for reliably transmitting, regardless of how large the size of image data to be transmitted is, a specific page containing information used for contacting the sender.

To achieve the above-stated aim, the present invention provides an Internet facsimile machine for transmitting image data of a document via e-mail. The Internet facsimile machine includes: a document read unit operable to read the document to obtain the image data; and a mail send unit operable to, when the document is a multi-page document, generate separate e-mails and attach image data of a specific page of the document to one of the e-mails and image data of remaining pages to another of the e-mails.

With the structure stated above, it is ensured that the image data of a specific page of a document is successfully transmitted to the receiving end regardless of how large the size of image data of the entire document is. Thus, by providing contact information about the sender on the specific page, the recipient can contact the sender to request re-transmission of the facsimile even if the image data of all the pages is not transmitted. This leads to the more reliable management of image transmission both at the sending end and the receiving end.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 5 is a view showing a data structure of a job management table stored in a send job management unit; and FIG. 6 is a view showing how image data is divided.

DESCRIPTION OF THE PREFERRED EMBODIMENT

Referring to the accompanying drawings, the following describes an Internet facsimile machine (i.e. "FAX machine") according to a preferred embodiment of the present invention, and an image transmission method used by the FAX machine.

(1) Structure of Internet Facsimile Machine

Figure 1:
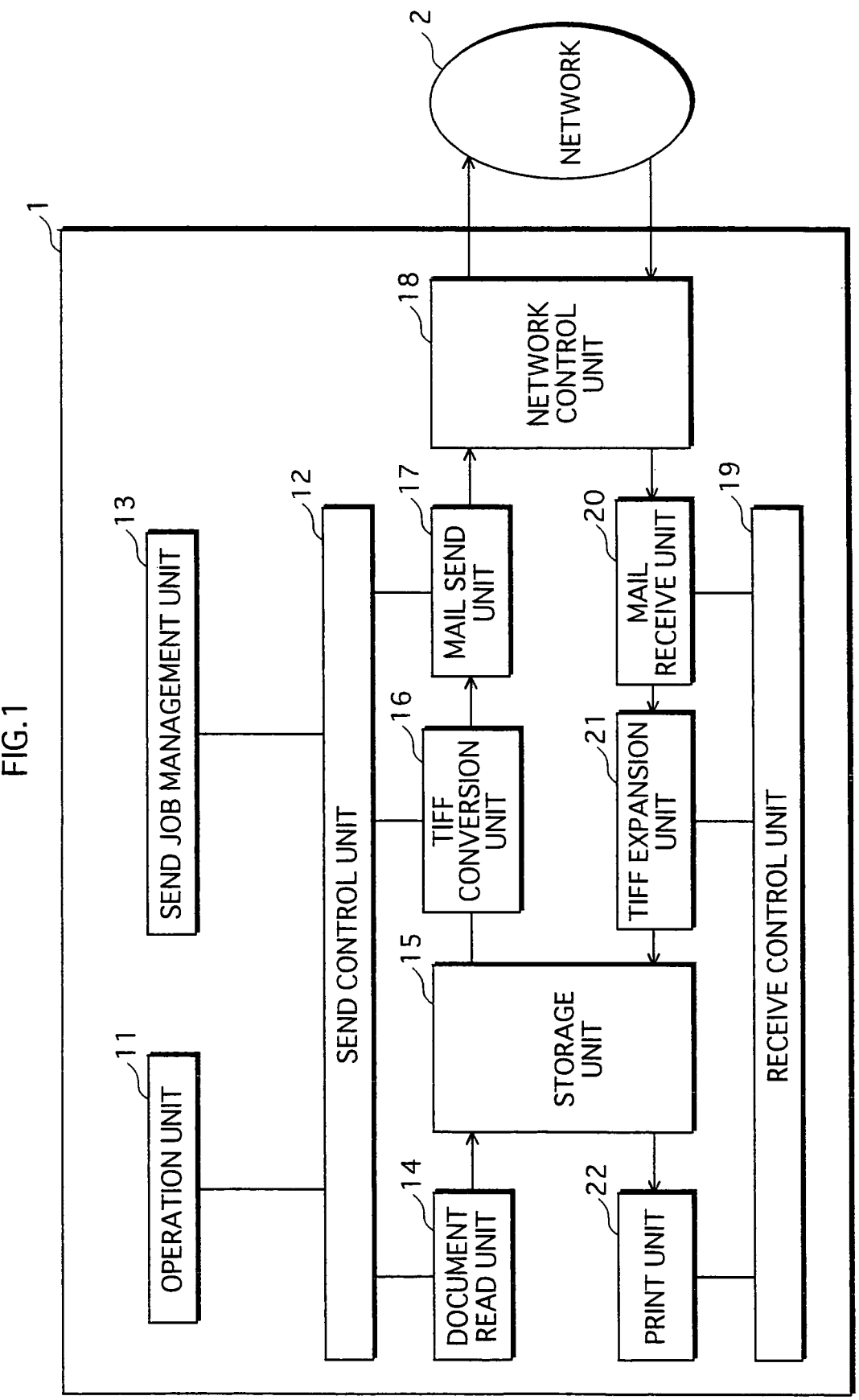
FIG. 1 is a block diagram showing a structure of an Internet facsimile machine according to an embodiment of the present invention.

FIG. 1 is a block diagram showing a structure of the FAX machine according to the present embodiment. As shown in the figure, the FAX machine is an MFP (Multifunction Peripheral) 1 capable of multiple jobs including a FAX job, a copy job, and a print job. The MFP 1 is connected to the Internet (not illustrated) via a network 2.

The MFP 1 is composed of an operation unit 11, a send control unit 12, a send job management unit 13, a document read unit 14, a storage unit 15, a TIFF (Tagged Image File Format) conversion unit 16, a mail send unit 17, a network control unit 18, a receive control unit 19, a mail receive unit 20, a TIFF expansion unit 21, and a print unit 22.

The operation unit 11 is provided with a panel for a user to input a recipient address, a read resolution, and a read image quality, as well as a start key for instructing to start facsimile transmission.

The send control unit 12 stores programs according to which the document read unit 14, the TIFF conversion unit 16, and the mail send unit 17 operate to carry out their respective functions.

The send job management unit 13 stores: the data inputted via the operation unit 11, such as the destination address, read resolution, and read image quality; the data obtained by the document read unit 14, such as the number of pages read and the paper size of the read document; and the data obtained by the TIFF conversion unit 16, such as the number of pages to be sent and the send state. The above-described data stored in the send job management unit 13 serves as send information.

The document read unit 14 reads a document to generate uncompressed image data. At the time of reading, the document read unit 14 also obtains data such as the number of pages read and the paper size of the document.

The storage unit 15 stores the uncompressed image data generated by the document read unit 14 on a page-by-page basis. The storage unit 15 also stores uncompressed data expanded by the TIFF expansion unit 21 on a page-by-page basis.

The TIFF conversion unit 16 encodes the uncompressed image data stored in the storage unit 15 to compressed image data in TIFF format (hereinafter, "TIFF file"), using Modified Huffman compression algorithm that is compliant with the Internet facsimile standard. In the case where image data to be compressed is of multiple pages, the image data is encoded into a single TIFF file containing multiple files (a multi-page TIFF file)

The mail send unit 17 generates an e-mail having a mail header showing the MIME (Multipurpose Internet Mail Extension) encode of a TIFF file attachment, a recipient address, and a sender address, and passes the e-mail with the TIFF file attachment to the network control unit 18.

The network control unit 18 performs fundamental network control, such as NIC (network interface card) control and protocol control. On receiving an outgoing e-mail from the mail send unit 17, the network control unit 18 converts the e-mail to data in Internet mail format, and sends out the resulting data to the network 2. On receiving incoming data in Internet mail format from the network 2, the network control unit 18 passes the received data to the mail receive unit 20.

The receive control unit 19 stores programs according to which the mail receive unit 20, the TIFF expansion unit 21, and the print unit 22 operate to carry out their respective functions.

The mail receive unit 20 receives the data in Internet mail format from the network control unit 18. Upon receipt of the data, the mail receive unit 20 recognizes the data as an e-mail, and thus analyzes and decodes the data as necessary, thereby reconstituting the e-mail.

The TIFF expansion unit 21 decodes a TIFF file attached to the e-mail to obtain uncompressed image data that the print unit 22 can process.

The print unit 22 prints out an image based on the uncompressed image data stored in the storage unit 15.

Note that the MFP 1 is provided with an NCU (Network Control Unit) and a modem, which are not illustrated. Thus, the MFP 1 is also capable of faxing image data over a telephone network connected to the NCU.

(2) Outline of Image Transmission Processing

Now, a description is given briefly to an image transmission method performed by the above-described MFP 1.

First, a description is given to the case where the MFP 1 acts as a sending facsimile machine. When a user inputs a recipient address on the panel of the operation unit 11 and pushes the start key, the data such as the recipient address is stored to the send job management unit 13 via the send control unit 12. In addition, a document read instruction is issued to the document read unit 14.

On receiving the document read instruction, the document read unit 14 reads a document to generate image data thereof, and stores the image data to the storage unit 15. In addition, the document read unit 14 obtains data such as the number of pages read and the paper size of the read document. The data obtained thereby is stored to the send job management unit 13 via the send control unit 12.

The uncompressed image data stored in the storage unit 15 is converted to a TIFF file by the TIFF conversion unit 16. By the mail send unit 17, the resulting TIFF file is attached to an e-mail and passed to the network control unit 18. The network control unit 18 sends the e-mail to an SMTP server (not illustrated) on the network 2. More detailed description is given later to the processing from image data conversion to e-mail sending, performed by the send control unit 12, the document read unit 14, the TIFF conversion unit 16, and the mail send unit 17.

A description is now given to the case where the MFP 1 acts as a receiving facsimile machine. When the network control unit 18 receives data in Internet mail format over the network 2, the mail receive unit 20 converts the received data back into an e-mail. A TIFF file attached to the received e-mail is expanded by the TIFF expansion unit 21 to obtain uncompressed image data. The resulting image data is stored to the storage unit 15 and printed out by the print unit 22.

(3) Processing from Image Data Conversion to E-Mail Sending

Figure 2:
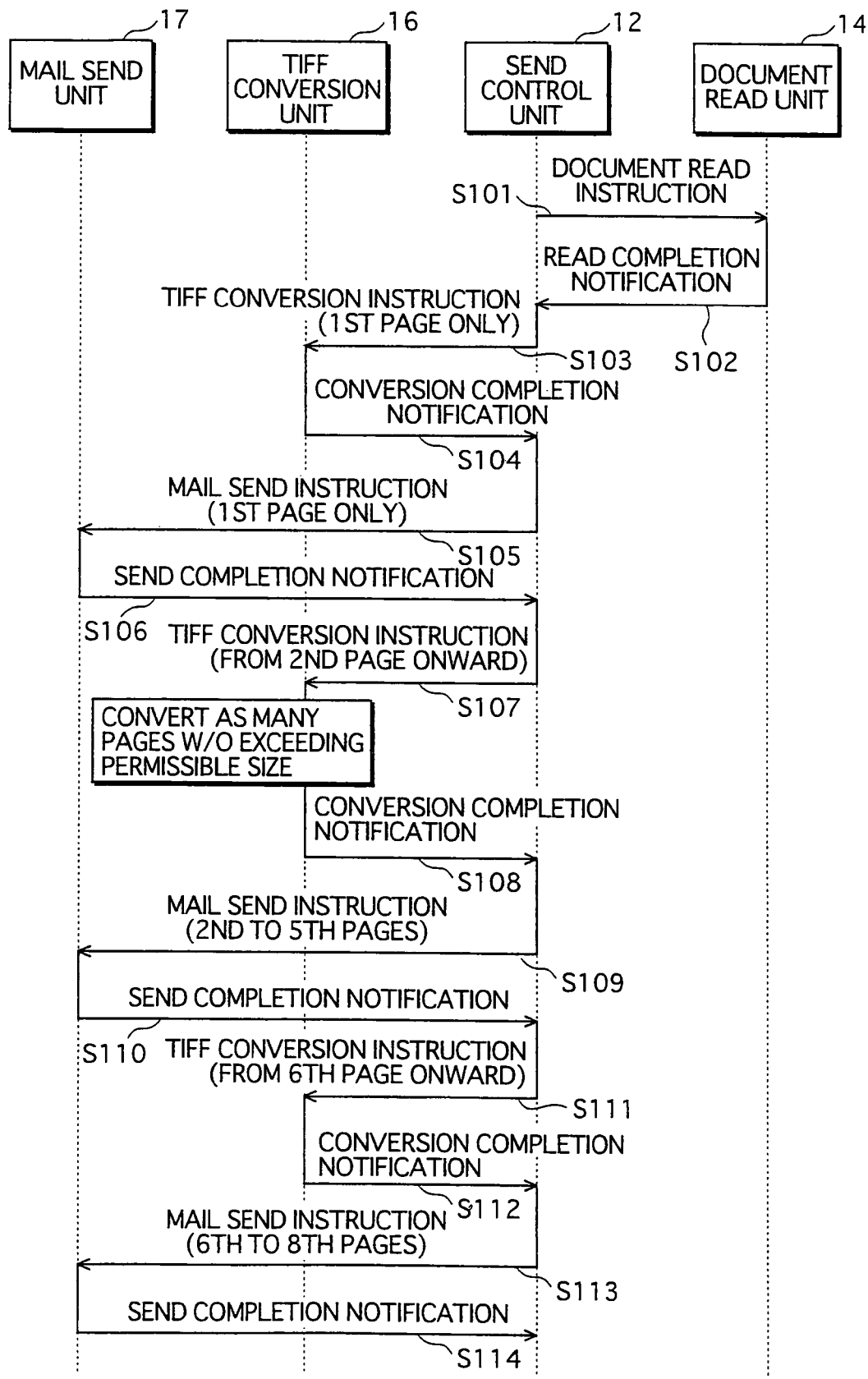
FIG. 2 is a sequence diagram illustrating the steps of processing from image data conversion to e-mail sending.

FIG. 2 is a sequence diagram illustrating the steps of processing from image data conversion to e-mail sending. With reference to FIG. 2, a description is given to an example of sending image data of an 8-page document of which first page is a cover page.

On receiving a user instruction to start facsimile transmission, the send control unit 12 instructs the document read unit 14 to read a document (step S101).

On receiving the document read instruction from the send control unit 12, the document read unit 14 reads the document placed by the user to generate uncompressed image data thereof, and stores the resulting image data to the storage unit

15. After reading all the document pages, the document read unit 14 notifies the send control unit 12 of the read completion (step S102).

On receiving the read completion notification from the document read unit 14, the send control unit 12 instructs the TIFF conversion unit 16 to convert, out of the entire uncompressed image data stored in the storage unit 15, image data of the first page of the document to a TIFF file (step S103). Note that the first page in this example serves as a specific page, and the meaning of "specific page" is described later.

On receiving the TIFF conversion instruction from the send control unit 12, the TIFF conversion unit 16 converts the uncompressed image data of the first page of the document to a TIFF file and stores the resulting TIFF file therein. Note that the TIFF file may alternatively be stored in the storage unit 15. After storing the TIFF file, the TIFF conversion unit 16 notifies the send control unit 12 of the conversion completion (step S104).

On receiving the conversion completion notification from the TIFF conversion unit 16, the send control unit 12 instructs the mail send unit 17 to send the TIFF file containing the first page image as the only attachment to a single e-mail (step S105).

On receiving the mail send instruction from the send control unit 12, the mail send unit 17 attaches the TIFF file to an e-mail and sends out the e-mail. After sending out the e-mail, the mail send unit 17 notifies the send control unit 12 of the send completion (step S106).

Through the above steps, the image of first page of the document is transmitted. Next, steps for transmitting the image of second to fifth pages are started.

On receiving the send completion notification from the mail send unit 17, the send control unit 12 instructs the TIFF conversion unit 16 to convert to a TIFF file, all the uncompressed image data stored in the storage unit 15 other than the already processed first page image data (step S107). In short, it is instructed to convert the image data from the second page onward.

On receiving the TIFF conversion instruction from the send control unit 12, the TIFF conversion unit 16 converts the uncompressed image data of the second to fifth pages to a TIFF file and stores the resulting TIFF file therein. This is because the image data conversion by the TIFF conversion unit 16 is sequentially performed in a manner that no resulting TIFF file exceeds the permissible size of the mail send unit 17. The details of the TIFF conversion are given later. After storing the TIFF file, the TIFF conversion unit 16 notifies the send control unit 12 of the conversion completion (step S108).

On receiving the conversion completion notification from the TIFF conversion unit 16, the send control unit 12 instructs the mail send unit 17 to send the TIFF file containing image data of the second to fifth pages as an attachment to a single e-mail (step S109).

On receiving the mail send instruction from the send control unit 12, the mail send unit 17 attaches the TIFF file to an e-mail and sends out the e-mail. After sending out the e-mail, the mail send unit 17 notifies the send control unit 12 of the send completion (step S110).

Through the above steps, the image of second to fifth pages of the document is transmitted. Next, steps for transmitting the image of six to eighth pages are started.

On receiving the send completion notification from the mail send unit 17, the send control unit 12 instructs the TIFF conversion unit 16 to convert to a TIFF file, all the uncompressed image data stored in the storage unit 15 other than the already processed image data of first to fifth pages (step S111). In short, it is instructed to convert the image data from the sixth page onward.

On receiving the TIFF conversion instruction from the send control unit 12, the TIFF conversion unit 16 converts the uncompressed image data of from the sixth page onward to a TIFF file and stores the resulting TIFF file. After storing the TIFF file, the TIFF conversion unit 16 notifies the send control unit 12 of the conversion completion (step S112).

On receiving the conversion completion notification from the TIFF conversion unit 16, the send control unit 12 instructs the mail send unit 17 to send the TIFF file containing image data of the sixth to eighth pages as an attachment to a single e-mail (step S113).

On receiving the mail send instruction from the send control unit 12, the mail send unit 17 attaches the TIFF file to an e-mail and sends out the e-mail. After sending out the e-mail, the mail send unit 17 notifies the send control unit 12 of the send completion (step S114).

In the above processing, the specific page is a page of which image is desired to be transmitted without fail. Specifically, the specific page is a page that contains information for the recipient to make a contact with the sender.

For example, the first or last page of a document may be a page containing contact information about the sender.

Generally, the first page of a document is often a so-called cover page showing, for example, the sender's name, mail address, postal address, telephone number, business organization. As long as the image of such a page is successfully transmitted to the receiving end, the recipient can readily identify the sender judging from the name on the page, for example. Thus, the recipient can make a contact with the sender, if necessary.

Also, the last page of a document is often a page on which the sender's signature is placed. This is especially true in the case of documents directed to overseas (i.e. in the case of non-Japanese documents). As long as the image of such a page is successfully transmitted to the receiving end, the recipient can readily identify the sender from the signature on the page. Thus, the recipient can make a contact with the sender, if necessary.

However, it should be naturally appreciated that the specific page is not limited to the first or last page of a document. As long as information for contacting the sender is shown, any page other than the first or last page of a document may serve as the specific page. Furthermore, in the above processing, the specific page is automatically designated according to the MFP 1 setting. Alternatively, the specific page may be designated by a user for each image transmission, or automatically by the MFP 1 by detecting a page containing an image that appears to be a FAX number.

Furthermore, in the above processing, it is not necessary to send the image data always via a plurality of e-mails. Alternatively, the MFP 1 or a user may judge whether to send the image data via a plurality of e-mails or a single e-mail. With this arrangement, the image data is sent via a plurality of e-mails rather than via a single e-mail only when necessary.

For example, before instructing TIFF conversion, the send control unit 12 of the MFP 1 may judge whether the size of uncompressed image data stored in the storage unit 15 exceeds a predetermined size. Only when the predetermined size is exceeded, the send control unit 12 instructs to separately convert image data of the specific page to a TIFF file. When the predetermined size is not exceeded, on the other hand, it is highly expected that the entire image data can be successfully transmitted as an attachment to a single e-mail.

Thus, the send control unit 12 in such a case instructs to collectively convert the entire image data to a TIFF file.

Here, the predetermined size may be equal to a minimum capacity reasonably expected for the mail send unit 17 of the sending MFP 1, the SMTP servers on the Internet, and the mail send unit 17 of the receiving MFP 1. Specifically, the size may be about 1 Mbyte, for example.

Furthermore, in the case where a user judges whether to send image data via a plurality of e-mails or a singe e-mail, a related user instruction may be given using the operation unit 11.

In the above processing, it is not necessary to divide the image data other than the specific page (i.e. the image data of second to eighth pages in this embodiment) into a plurality of pieces. Alternatively, the image data other than the specific page may always be transmitted collectively as an attachment to a single e-mail.

Alternatively, the image data other than the specific page may be divided into a plurality of pieces only when the image data exceeds a predetermined size (The size used herein may be different from the size used for judging whether to separately send the specific page, although it is preferable to use the same size in both judgments). When the predetermined size is not exceeded, the image data other than the specific page may be collectively sent via a single e-mail, rather than divided into a plurality of pieces to be sent via a plurality e-mails. With this arrangement, such a possibility is avoided that the image data is sent needlessly via a number of e-mails although the size of entire image data is small enough. Consequently, it is also avoided that the receiving facsimile machine is forced to go through more complicated operations for reconstructing the image data.

(4) Processing Performed by Send Control Information

Figure 3:
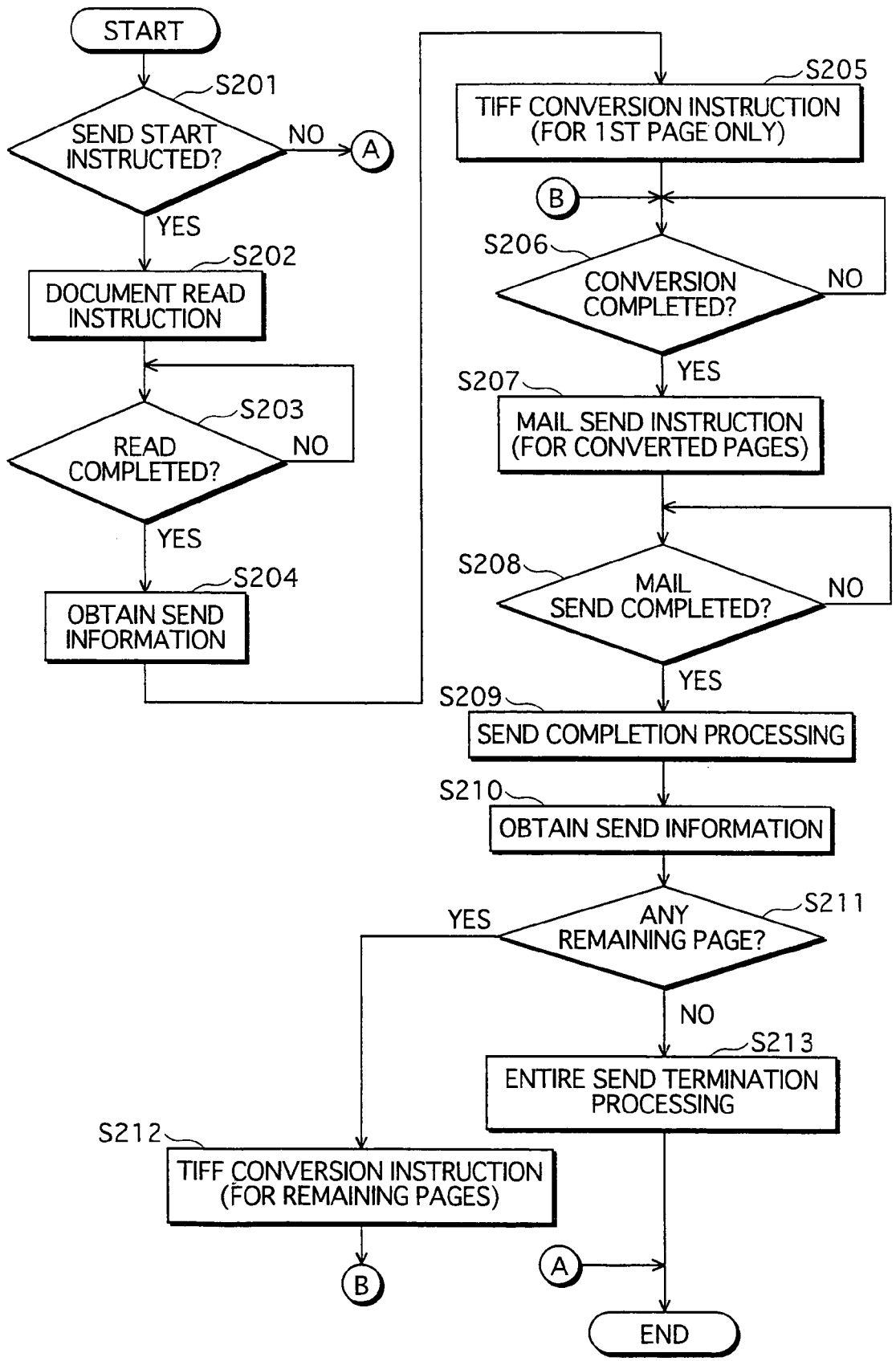
FIG. 3 is a flowchart of processing performed by a send control unit.

FIG. 3 is a flowchart of the processing performed by the send control unit 12. As shown in the figure, the send control unit 12 starts the processing when triggered by instructions and notifications from the operation unit 11, the document read unit 14, the TIFF conversion unit 16, and the mail send unit 17.

When a user inputs a recipient address, read resolution, and read image quality on the operation unit 11, and then pushes the start key, a send start instruction is given (step S201: YES). In response, the send control unit 12 instructs the document read unit 14 to read a document (step S202). In addition, the send control unit 12 stores the inputted data including the recipient address, read resolution, and read image quality to a job management table held in the send job management unit 13.

FIG. 5 is a view showing a data structure of the job management table stored in the send job management unit 13. As shown in the figure, the table is composed of a "No." column for storing a job number serially assigned to each send job, a "Recipient Address" column for storing a recipient address of each send job, a "Resolution" column for storing read resolutions instructed for each send job, a "No. of Pages Read" column for storing the number of pages of each document, a "Paper Size" column for storing the paper size of each document, a "No. of Pages Sent" column for storing the number of pages having been sent in each send job, and a "State" column for storing the state of each send job. The send job is either in the "converting", "sending", or "sent" state.

After reading the document, the document read unit 14 notifies the send control unit 12 of the read completion (step S203: YES). In addition, the document read unit 14 stores the data obtained at the time of reading the document to the respective columns of job management table, i.e. stores the number of pages read to the "No. of Pages Read" column and the paper size of the read document to the "Paper Size" column.

On receiving the read completion notification from the document read unit 14, the send control unit 12 obtains from the job management table the send information relating to the send job currently being performed (step S204). The send control unit 12 then judges which pages of the document is subjected to the next TIFF conversion. Specifically, the send control unit 12 refers to the "No. of Pages Sent" column. At this stage, no page has been sent, so that it is judged that only the first page is subjected to the next TIFF conversion.

Then, the send control unit 12 instructs the TIFF conversion unit 16 to convert the first page of the document to a TIFF file (step S205). In addition, the send control unit 12 updates the "State" column of the job management table by altering to the "Converting" state.

On receiving the TIFF conversion instruction, the TIFF conversion unit 16 converts the uncompressed image data of the first page of the document to a TIFF file, and then notifies the send control unit 12 of the conversion completion (step S206: YES). At this time, the send control unit 12 obtains information from the TIFF conversion unit 16 that the TIFF conversion has been done with respect to the first page only.

On receiving the conversion completion notification, the send control unit 12 instructs the mail send unit 17 to send the resulting TIFF file containing the already converted image data (i.e. the image data of the first page of the document) as an e-mail attachment (step S207). In addition, the send control unit 12 updates the "State" column of the job management table by altering to the "Sending" state.

On receiving the mail send instruction, the mail send unit 17 sends out the TIFF file containing the first page as an attachment to an e-mail, and then notifies the send control unit 12 of the send completion (step S208: YES). On receiving the send completion notification, the send control unit 12 performs the send completion processing (step S209). Specially, the send control unit 12 stores the value "1" in the "No. of Pages Sent" column, based on the information obtained from the TIFF conversion unit 16 that only the first page has been converted to TIFF. The send control unit 12 also updates the "State" column by altering to the "Sent" state.

Next, the send control unit 12 obtains the send information from the send job management unit 13 (step S210), and judges where there is any remaining page to be sent. Specifically, the send control unit 12 compares the value of the "No. of Pages Sent" column with the value of the "No. of Pages Read" column. If the two values are not equal, it is judged that there are one or more remaining pages to be sent. For example, in the case of the job No. 1 shown in FIG. 5, the "No. of Pages Read" column stores the value "8", whereas the "No. of Pages Sent" column stores the value "1". Accordingly, it is judged that there still are pages to be sent.

On judging that there is any remaining page (step S211: YES), the send control unit 12 instructs the TIFF conversion unit 16 to convert all the remaining pages to TIFF, i.e. from the second page onward (step S212). In addition, the send control unit 12 updates the "State" column of the job management table by altering to the "Converting" state.

On receiving the TIFF conversion instruction, the TIFF conversion unit 16 converts, out of all the remaining pages, image data of the second to fifth pages of the document to a TIFF file, so that the resulting TIFF file does not exceed the permissible size. The details of this TIFF conversion are given later.

When the TIFF conversion unit 16 completes the TIFF conversion of the second to fifth pages, the send control unit 12 obtains the information from the TIFF conversion unit 12 that the TIFF conversion has been completed up to the fifth page. The TIFF conversion unit 16 notifies the send control unit 12 of the conversion completion (step S206: YES). In response, the send control unit 12 instructs the mail send unit 17 to send the rustling TIFF file containing the second to fifth pages as an attachment to an e-mail (step S207). In addition, the send control unit 12 updates the "State" column of the job management table by altering to the "Sending" state.

After sending out the TIFF file containing the second to fifth pages as an attachment to an e-mail, the mail send unit 17 notifies the send control unit 12 of the send completion (step S208: YES). In response, the send control unit 12 performs the send completion processing (step S209). Specifically, the send control unit 12 alters the value of the "No. of Pages Sent" column to "5", based on the information obtained from the TIFF conversion unit 16 that up to fifth page has been converted to TIFF. The send control unit 12 also updates the "State" column by altering to the "Sent" state.

Then, the send control unit 12 again obtains the send information from the send job management unit 13 (step S210). On judging that there are remaining pages to be sent (step S211, YES), the send control unit 12 instructs the TIFF conversion unit 16 to convert image data of all the remaining pages, i.e. from the sixth page onward, to TIFF (step S212). In addition, the send control unit 12 updates the "State" column of the job management table by altering to the "Converting" state.

In response, the TIFF conversion unit 16 coverts from the sixth page onward, i.e. all the way from the sixth to eighth pages of the document, to a TIFF file. Upon completion of the conversion, the send control unit 12 obtains the information from the TIFF conversion unit 12 that the TIFF conversion has been completed all the way to the eighth page. The TIFF conversion unit 16 notifies the send control unit 12 of the conversion completion (step S206: YES). In response, the send control unit 12 instructs the mail send unit 17 to send the resulting TIFF file containing the sixth to eighth pages as an attachment to an e-mail (step S207). In addition, the send control unit 12 updates the "State" column of the job management table by altering to the "Sending" state.

After sending out the TIFF file containing the sixth to eighth pages as an e-mail attachment, the mail send unit 17 notifies the send control unit 12 of the send completion (step S208: YES). In response, the send control unit 12 performs the send completion processing (step S209). Specifically, the send control unit 12 alters the value of the "No. of Pages Sent" column to "8", based on the information obtained from the TIFF conversion unit 16 that all the way to eighth page has been converted to TIFF.

Next, the send control unit 12 obtains the send information from the send job management unit 13 (step S210). On judging that there is no more remaining page to be sent (step S211: NO), the send control unit 12 performs the entire send termination processing (step S213). Specifically, the "State" column is updated by alternating to the "Sent" state, thereby terminating the entire send job.

(5) TIFF Conversion Processing

Figure 4:
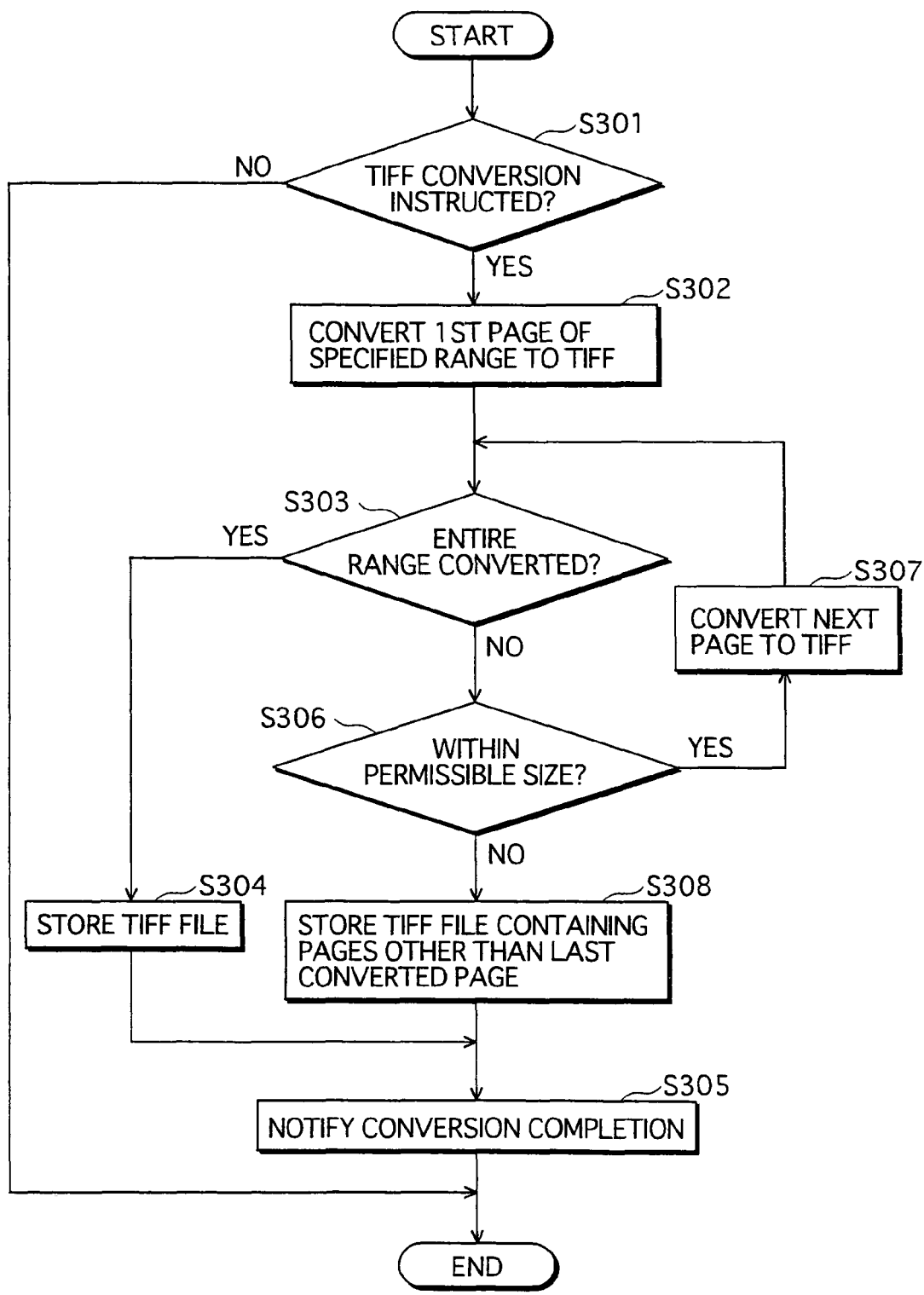
FIG. 4 is a flowchart of processing performed by a TIFF conversion unit.

FIG. 4 is a flowchart of the processing performed by the TIFF conversion unit 16.

As shown in the figure, on receiving the TIFF conversion instruction from the TIFF conversion unit 16 (step S301: YES), the send control unit 12 obtains the uncompressed image data from the storage unit 15, and converts the first page of the specified range to a TIFF file (step S302).

Here, the specified range is a range of image data that the TIFF conversion unit 16 is instructed to convert. The range is specified by the send control unit 12 on a page-by-page basis, in accordance with the setting regarding the specific first page as well as the send information in the job management table stored in the send job management unit 13.

As described above, the specific page in this embodiment is the first page of the document. Thus, the range specified for the first TIFF conversion covers the first page of the document only. Naturally, the first page of the specified range is equal to the first page of the document.

After converting the entire specified range, which in this case is the first page of the document, to TIFF (step S303: YES), the TIFF conversion unit 16 stores the resulting TIFF file (step S304), and notifies the send control unit 12 of the conversion completion (step S305).

Next, the send control unit 12 specifies all the remaining pages (i.e. from the second page onward) and instructs the TIFF conversion unit 16 to convert the specified range.

On receiving the TIFF conversion instruction (step S301: YES), the TIFF conversion unit 16 obtains the uncompressed image data from the storage unit 15 and converts the first page of the specified range, which in this case is the second page of the document, to TIFF (step S302). After converting the second page of the document, the TIFF conversion unit 16 judges whether the entire specified range has been converted to TIFF (step S302) At this stage, the specified range other than the second page of the document has not yet been converted. Thus, it is judged that the entire specified range has not yet been converted (step S303: NO), so that the processing branches to a step S306.

In the step S306, the TIFF conversion unit 16 judges whether the resulting TIFF file is still within the permissible size. At this stage, it is judged that the TIFF file containing only the second page falls within the permissible size (step S306: YES). Thus, the TIFF conversion unit 16 proceeds to convert the uncompressed data of the next page, which in this case is the third page of the document, to TIFF (step S307) and then returns to the step S303.

After converting the third page of the document to TIFF, the TIFF conversion unit 16 again judge whether the entire specified range has been converted. On judging that the entire range has not yet been converted (step S303: NO), the TIFF conversion unit 16 again judges whether the resulting TIFF file is within the permissible size. On judging that the resulting TIFF file is within the permissible size (step S306: YES), the TIFF conversion unit 16 converts the uncompressed image data of the next page, which in this case is the fourth page of the document, to TIFF (step S307).

The TIFF conversion unit 16 repeats the steps S303, S306, and S307 sequentially on the uncompressed image data of the fourth, fifth, and sixth pages of the document until it is judged in the step S306 that the resulting TIFF file exceeds the permissible size. On judging that the TIFF file is no longer within the permissible size (step S306: NO), the TIFF conversion unit 16 stores the TIFF file containing all the pages having been converted, except for the last converted page, which in this case is the sixth page of the document (step S308). The TIFF conversion unit 16 then notifies the send control unit 12 of the conversion completion (step S305).

Next, the send control unit 12 specifies all the way from sixth page to the last page of the document and instructs the TIFF conversion unit 16 to convert the specified range to TIFF.

On receiving the TIFF conversion instruction (step S301), the TIFF conversion unit 16 obtains the uncompressed image data from the storage unit 15, and converts the first page of the specified range, which in this case is the sixth page of the document, to TIFF (step S302).

After the conversion, the TIFF conversion unit 16 judges that the entire specified range is not yet converted (step S303: NO), and further judges that the resulting TIFF file still falls within the permissible size (step S306: YES) Thus, the TIFF conversion unit 16 converts the uncompressed image data of next page, which in this case is the seventh page of the document, to TIFF (step S307).

Thereafter, the TIFF conversion unit 16 judges that the resulting TIFF file containing the sixth and seventh pages of the document is still within the permissible range (step S306: YES). Thus, the same steps are performed to sequentially covert the seventh and eighth pages to TIFF (step S303: NO, step S306: YES, and step S307).

On judging that the entire specified range has been completed (step S303: YES), the TIFF conversion unit 16 stores to the storage unit 15, the resulting TIFF file containing sixth to eighth pages (step S308). Then, the TIFF conversion unit 16 notifies the send control unit 12 of the conversion completion (step S305).

FIG. 6 is a view showing how the image data is divided as a result of the above processing. As shown in the figure, the image data is divided into the following three pieces: the image data of the first page of the document, which is the specific page; the image data of the second to fifth pages; and the image data of the sixth to eighth pages. The three pieces of image data are separately sent each as an attachment to a different e-mail.

Note that in the case where the last page of the document is designated as the specific page, the range specified first will cover the eighth page of the document only, and the range specified next will cover the first to seventh pages of the document. In this case, for example, the image data is divided into the following three pieces: the image data of the first to third pages, the image data of the fourth to seventh pages, and the image data of the eighth page. Each piece of image data is separately sent as an attachment to a different e-mail.

As described above, it is endured that at least image data of the specific page (first page) of the document is successfully sent to the recipient, unless the SMTP servers on the Internet or the receiving MFP 1 are extremely small incapacity. Consequently, even if the transmission fails for image data of the other pages of the document, the recipient can make a contact with the sender using the information shown on the specific page, which has been successfully received, in order to inform the sender that the transmission of the remaining pages has failed. With this arrangement, it is avoided the transmission failure is left unattended and the facsimile ends up undelivered. This effect is achieved without increasing the number of e-mails used for facsimile transmission.

The present invention is applicable to Internet facsimile machines capable of sending image data of a document by attaching the image data to e-mail.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A transmission apparatus for transmitting image data of a document via at least one e-mail, comprising:
    a document obtain unit operable to obtain the image data of the document;
    a mail send unit operable to, when the document is a multi-page document, generate separate e-mails, and attach image data of a specific page of the document which is obtained by the document obtain unit to a first e-mail to be sent of the separate e-mails in an instance when the specific page is the first page of the multi-page document and in an instance when the specific page is a page of the multi-page document other than the first page, the specific page containing information used for contacting the sender, and attach image data of remaining pages to either a single one or a plurality of the separate e-mails based on a determination of whether the image data of the remaining pages collectively exceeds a predetermined size;
    a detecting unit for detecting the information used for contacting the sender from the multi-page document; and
    a designation unit for designating a page as the specific page based on the detection of the information used for contacting the sender.

2. The transmission apparatus according to claim 1, further comprising:
    a conversion unit operable to convert the specific page of the obtained document into image data suitable to be sent by e-mail wherein the mail send unit is operable to send a completion notification to the conversion unit after the first e-mail has been sent and the conversion unit is operable to convert the remaining pages of the obtained document into image data suitable to be sent by e-mail.

3. The transmission apparatus according to claim 1, wherein the separate e-mails are generated only when image data of the entire document exceeds a predetermined size.

4. The transmission apparatus according to claim 1, wherein the transmission apparatus is an Internet facsimile machine having a document read unit operable to read the document to obtain the image data.

5. The transmission apparatus according to claim 4, wherein the information used for contacting the sender is a facsimile number.

6. An image transmission method for execution by a transmission apparatus to transmit image data of a document via at least one e-mail, comprising:
    a document obtain step of obtaining the image data of the document;
    a mail send step of, when the document is a multi-page document, generating separate e-mails, and attaching image data of a specific page of the document which is obtained during the document obtain step to a first e-mail to be sent of the separate e-mails in an instance when the specific page is the first page of the multi-page document and in an instance when the specific page is a page of the multi-page document other than the first page, the specific page containing information used for contacting the sender, and attaching image data of remaining pages to either a single one or a plurality of the separate e-mails based on a determination of whether the image data of the remaining pages collectively exceeds a predetermined size;
    detecting the information used for contacting the sender from the multi-page document; and
    designating a page as a specific page based on the detection of the information used for contacting the sender.

7. The image transmission method according to claim 6, further comprising:
    converting the specific page of the obtained document into image data suitable to be sent by e-mail and after the first e-mail has been sent, converting the remaining pages of the obtained document into image data suitable to be sent by e-mail.

8. The image transmission method according to claim 6, wherein the separate e-mails are generated only when image data of the entire document exceeds a predetermined size.

9. The transmission method according to claim 6, wherein the method is executed by an Internet facsimile machine having a document read unit operable to read the document to obtain the image data.

10. The image transmission method according to claim 9, wherein the information used for contacting the sender is a facsimile number.

* * * * *